No. 769,276. PATENTED SEPT. 6, 1904.
J. REILLEY.
PORTABLE FORGE.
APPLICATION FILED DEC. 19, 1903.
NO MODEL.
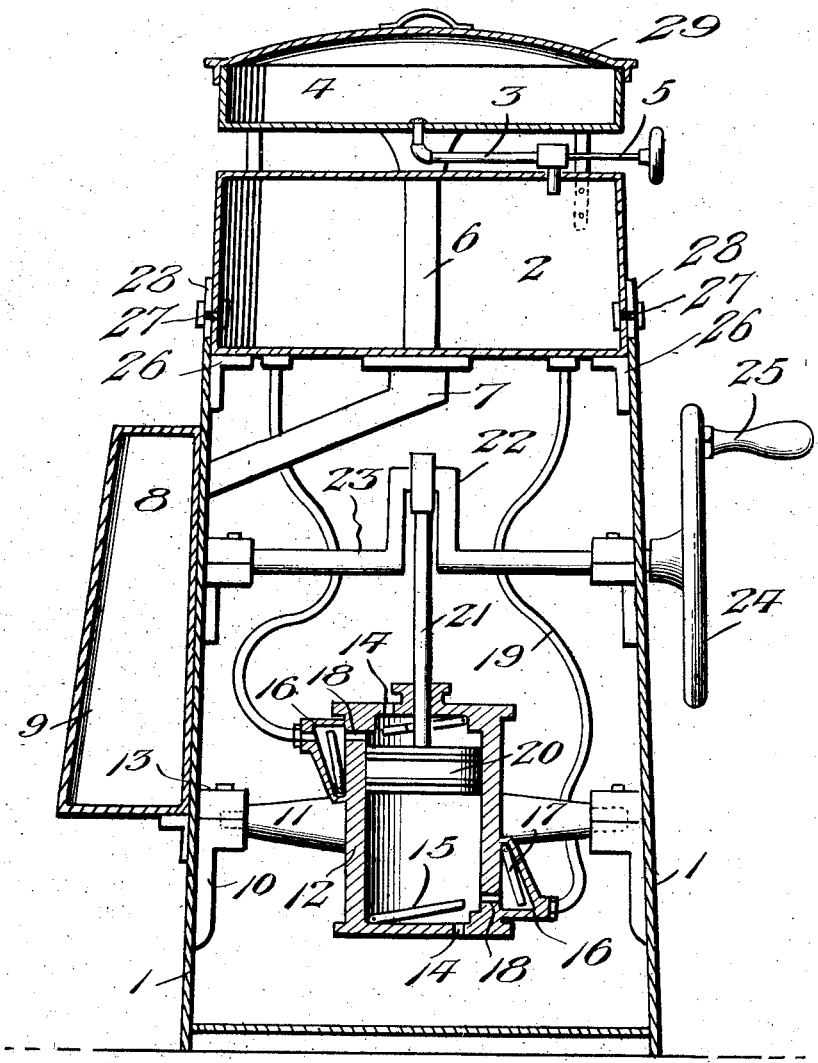

No. 769,276.

Patented September 6, 1904.

UNITED STATES PATENT OFFICE.

JOHN REILLEY, OF JERSEY CITY, NEW JERSEY.

PORTABLE FORGE.

SPECIFICATION forming part of Letters Patent No. 769,276, dated September 6, 1904.

Application filed December 19, 1903. Serial No. 185,826. (No model.)

*To all whom it may concern:*

Be it known that I, JOHN REILLEY, a citizen of the United States, residing at Jersey City, in the county of Hudson and State of New Jersey, have invented new and useful Improvements in Portable Forges, of which the following is a specification.

My invention relates to new and useful improvements in portable forges; and its object is to provide a compact device of this character having means for compressing air within a suitable receiver, from which it can be discharged in desired quantities into the bowl of the forge.

A further object is to provide simple means whereby the air can be quickly and readily compressed.

With the above and other objects in view the invention consists of a receptacle suitably supported below the bowl of the forge and having valved connection with the bottom thereof. A cylinder is mounted below the receptacle and has a compressing-piston therein adapted to be reciprocated manually. Tubular connections are provided between the cylinder and the receptacle, and valves are also employed for holding the compressed air within the receptacle.

The invention also consists in the further novel construction and combination of parts hereinafter more fully described and claimed, and illustrated in the accompanying drawing, which is a front elevation of my improved forge, the cylinder, receptacle, and bowl being shown in section.

Referring to the drawing by numerals of reference, 1 is a casing, to which is connected an air-tight receptacle 2. An outlet-pipe 3 extends from this receptacle and opens through the bottom of the bowl 4 of the forge, and a valve 5 is arranged in the pipe 3 for the purpose of regulating the discharge of air therethrough. An outlet 6 extends from the bowl 4 into a chute 7, which opens into a receiver 8, which is slidably mounted within a casing 9, secured to one side of the forge. Brackets 10 are secured to opposite sides of casing 1 and form bearings for trunnions 11, which project from opposite sides of a cylinder 12. These trunnions are held against displacement by means of caps 13, secured to the brackets 10. Inlets 14 are formed in the ends of cylinder 12 and are adapted to be closed by valves 15, mounted within the cylinder at the ends thereof. Valve-casings 16 are arranged at the sides of the cylinder and each contains a valve 17, adapted to close an outlet-port 18, opening into the casing 16. A tube 19 extends from each valve-casing 16 to the receptacle 2, and these tubes are preferably formed of flexible material. A piston 20 is slidably mounted within cylinder 12 and is connected, by means of a rod 21, with a crank 22, extending from a shaft 23, journaled within the casing 1. This shaft has a fly-wheel 24 secured thereto and a handle 25 connected to said wheel. The receptacle 2 is preferably mounted within the casing 1 and upon brackets 26 and is secured in place by bolts 27, which extend through slots 28, formed in the sides of the casing at the upper end thereof. The outlet-pipe 6 is permanently secured in the receptacle 2 and projects outward into the chutes 7.

It will be understood that when shaft 23 is rotated by means of the handle 25 the piston 20 will reciprocate within cylinder 12 and cause said cylinder and its trunnions to rotate on the bearings 10. As the piston is reciprocated air will be drawn into the cylinder through inlets 14 and will be forced outward through the ports 18 into casing 16 and thence through the tubes 19 to receptacle 2. The air will be compressed in this receptacle and is discharged therefrom in desired quantities into the bowl 4 by turning the valve 5. Ashes, cinders, &c., can be discharged from the bowl through the outlet 6 and chute 7 and into the removable receiver 8.

It will be seen that this improved forge can be readily taken apart for the purpose of cleaning or repairing the same. When it is desired to remove the bowl 4 and the receptacle 2, it is merely necessary to loosen the bolts 27, so as to permit the receptacle to be raised from the brackets 26.

The oscillating pump formed by the cylinder 12 and the parts connected thereto is thoroughly protected from water, &c., and the forge can therefore be left exposed to the elements without danger of injury thereto.

When it is desired to remove the forge, the ash-receiver 8 is first removed from the casing 9, and there is therefore no danger of displacement of any of the parts or the dropping of hot ashes. A hood 29 may, if desired, be detachably secured in place over the bowl 4.

In the foregoing description I have shown the preferred form of my invention; but I do not limit myself thereto, as I am aware that modifications may be made therein without departing from the spirit or sacrificing any of the advantages thereof, and I therefore reserve the right to make such changes and alterations as fairly fall within the scope of my invention.

Having thus fully described my invention, what I claim as new, and desire to secure by Letters Patent, is—

1. In a forge, the combination with a casing, a removable receiver, a bowl having an outlet into the receiver, an air-receptacle, and a valved connection between the receptacle and bowl; of a cylinder, trunnions thereon journaled in the casing, valved inlets and outlets to the cylinder, a piston within the cylinder, a crank-shaft, a rigid connection between the crank-shaft and piston, and tubular connections between the outlets and the receptacle.

2. In a forge, the combination with a casing having brackets therein; of an air-receptacle detachably mounted upon the brackets, a bowl secured to and having valved connection with the receptacle, an oscillating pump, means for operating the same, flexible tubular connection between the pump and the receptacle, said pump and connections being located within the casing, a removable receiver, and means for directing material from the bowl to the receiver.

3. In a forge, the combination with a casing having brackets therein; of an air-receptacle detachably mounted upon the brackets, a bowl secured to and having valved connection with the receptacle, a removable receiver, means for directing material from the bowl to the receiver, and air-compressing mechanism connected to the receptacle.

4. The combination with a casing having slots therein, and brackets; of an air-receptacle detachably mounted upon the brackets, securing devices extending through the slots, a bowl arranged upon the receptacle, a valved connection between the bowl and receptacle, a removable receiver connected to the casing, means for discharging material from the bowl to the receiver, an oscillating pump, and means for conducting air therefrom to the receiver.

In testimony whereof I affix my signature in presence of two witnesses.

JOHN REILLEY.

Witnesses:
    MARY TERSEA MARTIN,
    HIRAM BRINK.